United States Patent
Wang et al.

(10) Patent No.: US 10,019,996 B2
(45) Date of Patent: Jul. 10, 2018

(54) ORIENTING A MICROPHONE ARRAY TO A USER LOCATION

(71) Applicant: LENOVO (Singapore) PTE. LTD., New Tech Park (SG)

(72) Inventors: Song Wang, Cary, NC (US); John Weldon Nicholson, Cary, NC (US); Ming Qian, Cary, NC (US)

(73) Assignee: LENOVO (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 15/250,676

(22) Filed: Aug. 29, 2016

(65) Prior Publication Data

US 2018/0061422 A1    Mar. 1, 2018

(51) Int. Cl.
| | |
|---|---|
| G10L 21/00 | (2013.01) |
| G10L 17/22 | (2013.01) |
| G10L 17/04 | (2013.01) |
| G10L 17/18 | (2013.01) |
| G10L 25/00 | (2013.01) |

(52) U.S. Cl.
CPC .............. *G10L 17/22* (2013.01); *G10L 17/04* (2013.01); *G10L 17/18* (2013.01)

(58) Field of Classification Search
CPC .......... G10L 17/22; G10L 17/18; G10L 17/04
USPC .......... 704/206, 231, 246, 251, 270
See application file for complete search history.

(56) References Cited

U.S. PATENT DOCUMENTS

| | | | | |
|---|---|---|---|---|
| 2004/0172256 | A1* | 9/2004 | Yokoi .................... | G01C 21/00 704/275 |
| 2014/0219471 | A1* | 8/2014 | Deshpande ............ | H04R 3/005 381/92 |
| 2015/0348548 | A1* | 12/2015 | Piernot .................... | G10L 15/22 704/235 |

* cited by examiner

*Primary Examiner* — Thierry L Pham
(74) *Attorney, Agent, or Firm* — Kunzler, PC

(57) ABSTRACT

For orienting a microphone array to a user location, a processor detects a user location with a presence sensor that detects a user using electromagnetic signals. In addition, the processor orients a microphone array to the user location.

19 Claims, 12 Drawing Sheets

ORIENTING A MICROPHONE ARRAY TO A USER LOCATION

FIELD

The subject matter disclosed herein relates to microphone arrays and more particularly relates to orienting a microphone array to a user location.

BACKGROUND

Description of the Related Art

Voice assistants often receive triggers in environments with multiple audible sources.

BRIEF SUMMARY

An apparatus for orienting a microphone array to a user location is disclosed. The apparatus includes a presence sensor that detects a user using electronic magnetic signals, a processor, and a memory that stores code executable by the processor. The processor detects the user location with the presence sensor. In addition, the processor orients a microphone array to the user location. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
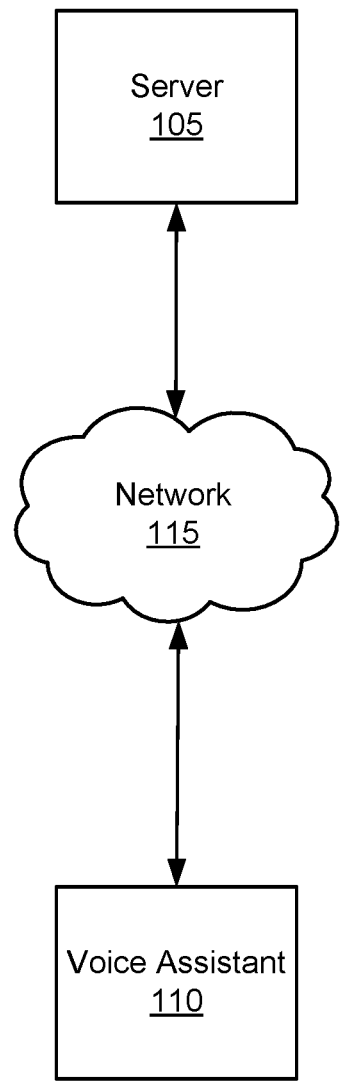
FIG. 1A is a schematic block diagram illustrating one embodiment of a voice assistant system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram illustrating one embodiment of a voice assistant system 100. The voice assistant system 100 may receive audible commands, requests, and prompts, referred to hereafter as triggers, from a user. The voice assistant system 100 may further process the triggers and respond appropriately to the user. In the depicted embodiment, the voice assistant system 100 includes a server 105, a network 115, and a voice assistant 110.

The voice assistant 110 may receive triggers from one or more users. The voice assistant 110 may process and respond to the triggers. Alternatively, the voice assistant 110 may communicate the triggers via the network 115 to the server 105. The network 115 may comprise one or more of the Internet, a wide-area network, a local area network, a Wi-Fi network, and a mobile telephone network. The server 105 may process a trigger and communicate a response to the trigger through the network 115 to the voice assistant 110.

Unfortunately, environmental noise may obscure a trigger and/or generate false triggers. As a result, the system 100 may not correctly interpret a trigger. In addition, the system 100 may respond to a false trigger, to the annoyance of the user.

The embodiments described herein detect a user location with a presence sensor and orient a microphone array to the user location to improve the reception of the trigger. In addition, the embodiments may respond to a plurality of triggers based on the order that each trigger was received and respond with a speaker oriented towards the user location from which the trigger was received. The embodiments may further determine that a trigger is a false trigger and record the false trigger to learning structure. The embodiments may employ the learning structure to detect future false triggers as will be described hereafter.

Figure 1B:
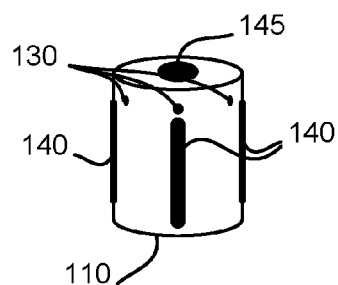
FIG. 1B is a perspective drawing illustrating one embodiment of a voice assistant.

FIG. 1B is a perspective drawing illustrating one embodiment of a voice assistant 110. The voice assistant 110 is depicted as a cylinder with one or more presence sensors 130, speakers 140, and a microphone array 145 disposed on the voice assistant 110. However, the voice assistant 110, speakers 140, microphone array 145, and presence sensors 130 may be organized in other configurations.

The voice assistant 110 may detect a user location with one or more presence sensors 130. Each presence sensor 130 may detect a user using electromagnetic signals. In one embodiment, a presence sensor 130 only detects the user using electromagnetic signals. The presence sensor 130 may be one or more of a thermopile, a camera, and a network interface. The electromagnetic signals may include an infrared signal, an optical signal, and/or a wireless communication signal.

For example, a presence sensor 130 may detect a user location by detecting an infrared signal from the user. In addition, the presence sensor 130 may detect the user location by detecting the user with in an image captured by a camera. In one embodiment, the presence sensor 130 may detect the user location by detecting a wireless communication signal from an electronic device such as a mobile telephone that is carried by the user.

In addition, the voice assistant 110 may receive triggers with the microphone array 145. The microphone array 145 is described in more detail in FIG. 1F. The voice assistant 110 may communicate responses through the speakers 140. The speakers 140 may be directional speakers 140.

Figure 1C:
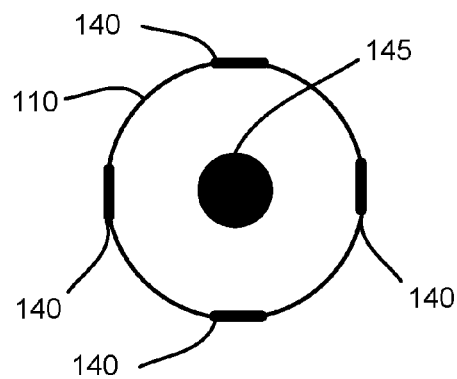
FIG. 1C is a top view drawing illustrating one embodiment of a voice assistant.

FIG. 1C is a top view drawing illustrating one embodiment of the voice assistant 110. In the depicted embodiment, the microphone array 145 is centrally located on the voice assistant 110. Directional speakers 140 are oriented in one or more directions from the voice assistant 110. In one embodiment, a response may be directed in a specified direction as will be described hereafter in FIG. 1H.

Figure 1D:
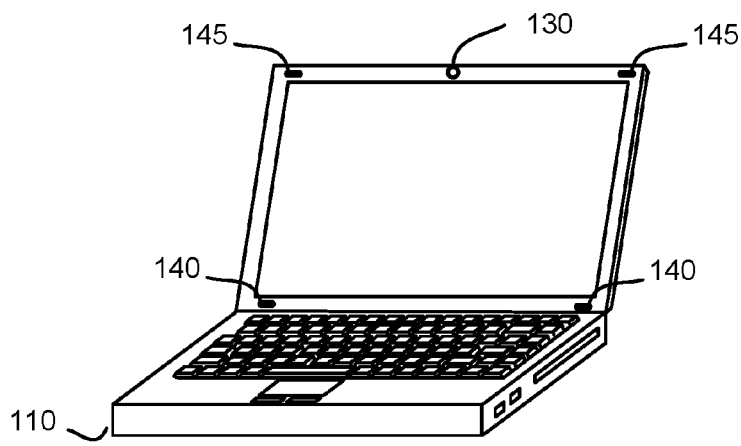
FIG. 1D is a perspective drawing illustrating one embodiment of a voice assistant on a computer.

FIG. 1D is a perspective drawing illustrating one embodiment of a voice assistant on a computer 110. In the depicted embodiment, the voice assistant 110 is embodied in a computer with a presence sensor 130, a microphone array 145, and one or more speakers 140. The presence sensor 130 may be a camera.

Figure 1E:
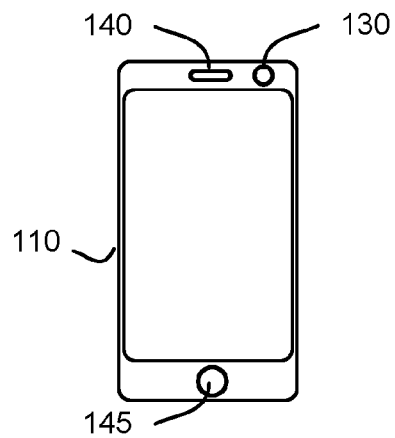
FIG. 1E is a front view drawing illustrating one embodiment of a voice assistant on a mobile telephone.

FIG. 1E is a front view drawing illustrating one embodiment of a voice assistant on a mobile telephone 110. In the depicted embodiment, the voice assistant 110 is embodied in a mobile telephone with a presence sensor 130, a microphone array 145, and a speaker 140. The presence sensor 130 may be a camera.

Figure 1F:
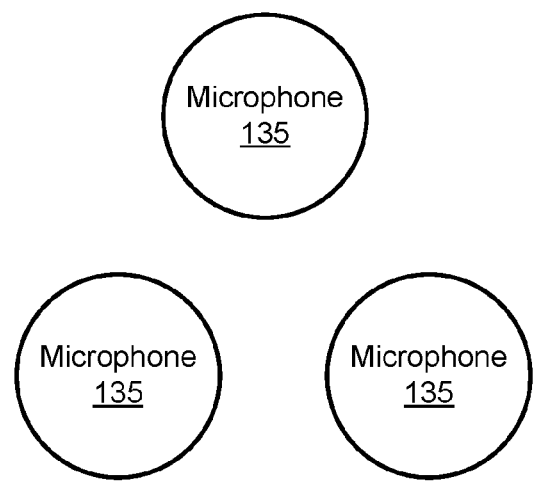
FIG. 1F is a schematic drawing illustrating one embodiment of a microphone array.

FIG. 1F is a schematic drawing illustrating one embodiment of the microphone array 145. In the depicted embodiment, the microphone array 145 includes three microphones 135. However, the microphone array 145 may include two or more microphones 135 in various configurations. Signals from the microphones 135 may be combined to generate one or more directional microphone responses.

Figure 1G:
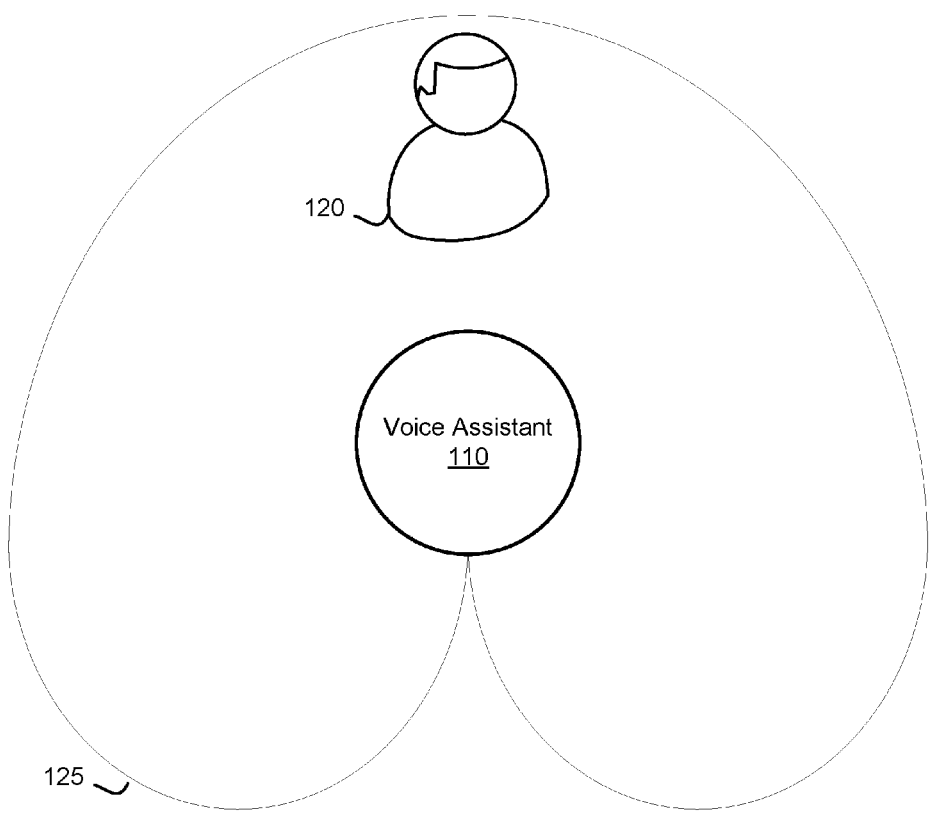
FIG. 1G is a schematic drawing illustrating one embodiment of a directional microphone response.

FIG. 1G is a schematic drawing illustrating one embodiment of a directional microphone response 125. In the depicted embodiment, signals from the microphones 135 of the microphone array 145 on the voice assistant 110 are combined to form a cardioid directional microphone response 125. The directional microphone response 125 may be shaped to capture a trigger from the user location 120. Other directional microphone responses 125 may be formed without limitation.

Figure 1H:
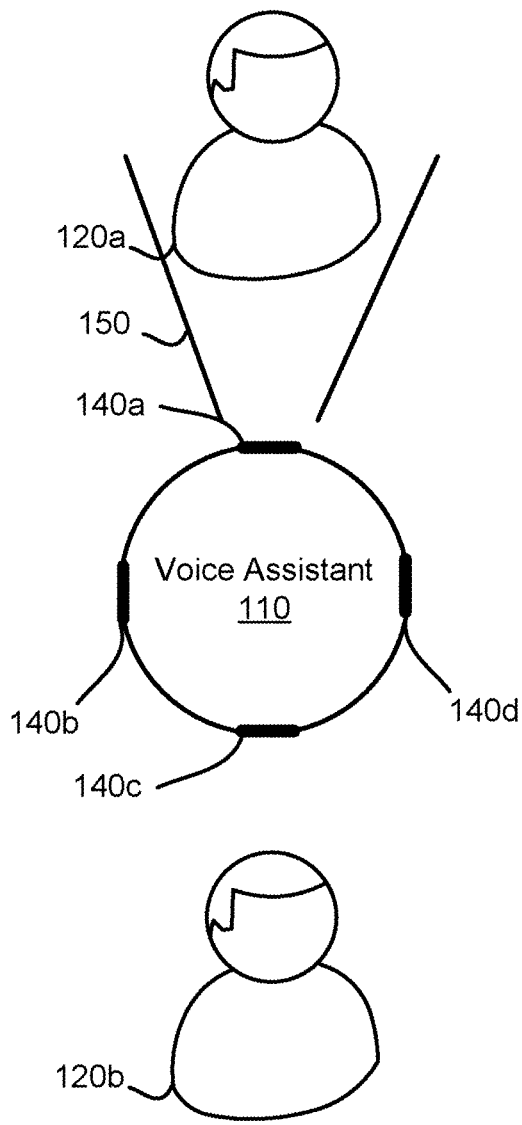
FIG. 1H is a schematic drawing illustrating one embodiment of directional speakers.

FIG. 1H is a schematic drawing illustrating one embodiment of directional speakers 140. Two user locations 120a-b are shown relative to a voice assistant 110. In the depicted embodiment, the presence sensor 130 of the voice assistant 110 detects a first user location 120a of a first user. The voice assistant 110 a respond to a trigger from the first user with a directional response 150 from a first speaker 140a that is oriented towards the first user location 120a.

Figure 2:
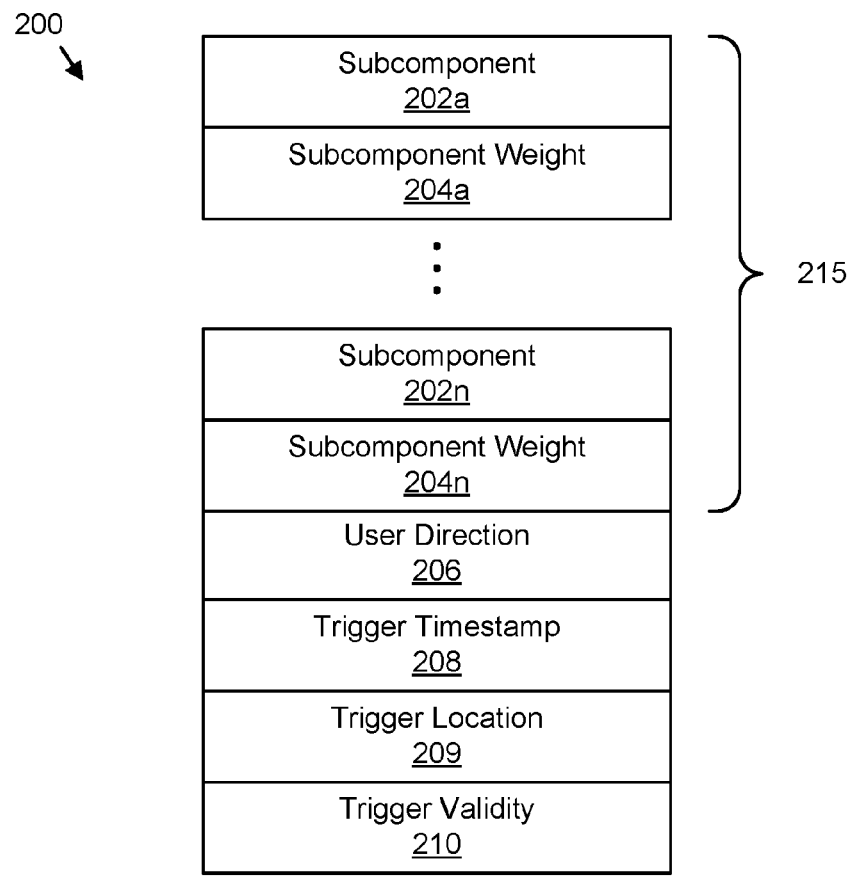
FIG. 2 is a schematic block diagram illustrating one embodiment of trigger data.

FIG. 2 is a schematic block diagram illustrating one embodiment of trigger data 200. The trigger data 200 may be organized as a data structure in a memory. The trigger data 200 may store data for a trigger received by the voice assistant 110. As the trigger is audible, the trigger data 200 may also illustrate the trigger. In the depicted embodiment, the trigger data 200 includes a learning structure 215, a user direction 206, a trigger timestamp 208, a trigger location 209, and a trigger validity 210.

The learning structure 205 may comprise one or more subcomponents 202 with a corresponding subcomponent weight 204. Alternatively, the learning structure 205 may comprise a neural network as is illustrated in FIG. 4B. Each subcomponent 202 may be parsed from a trigger. A subcomponent 202 may be a phoneme, a syllable, a word, a phrase, or the like. The subcomponent weight 204 may be associated with the subcomponent 202. In one embodiment, the subcomponent weight 204 may be generated over time by one or more statistical and/or mathematical processes. The subcomponents 202 and the subcomponent weights 204 may be used to determine if a trigger is false using independent component analysis as will be described hereafter.

The user direction 206 may specify a direction to a user location 120 from which a trigger is received. The user direction 206 may be determined from the presence sensors 130. The trigger timestamp 208 may specify when the trigger is received. The trigger location 209 may record a location of the voice assistant 210 when the trigger is received. The trigger validity 210 may indicate whether or not the trigger is valid.

Figure 3:
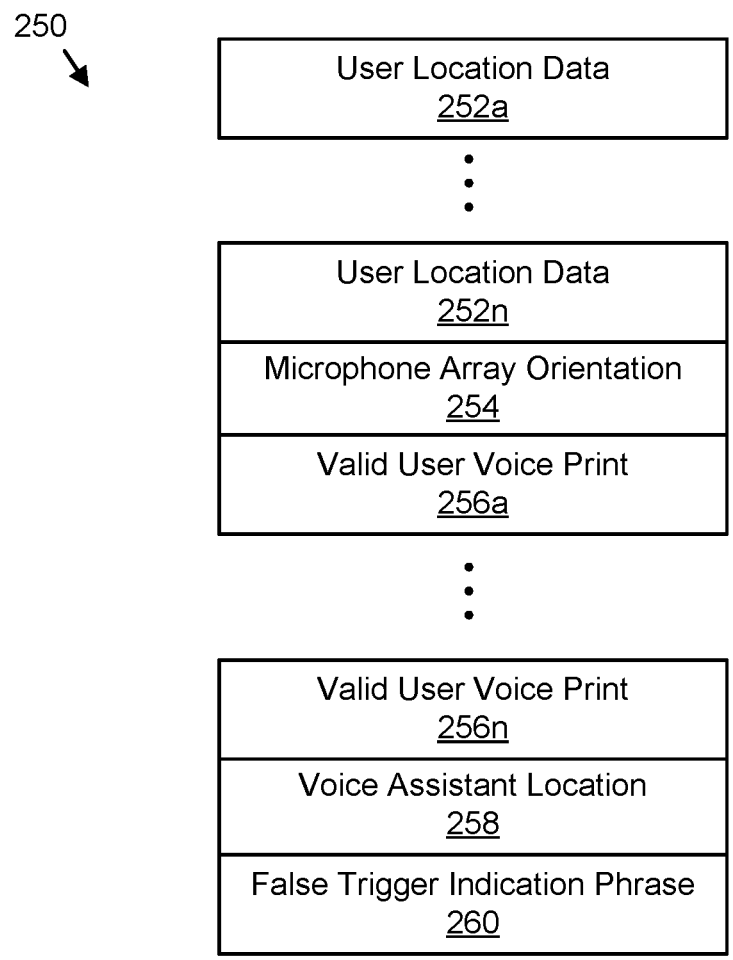
FIG. 3 is a schematic block diagram illustrating one embodiment of voice assistant data.

FIG. 3 is a schematic block diagram illustrating one embodiment of voice assistant data 250. The voice assistant data 250 may be organized as a data structure in a memory. The voice assistant data 250 may store data used by the voice assistant 110. In the depicted embodiment, the voice assistant data 250 includes user location data 252 for one or more user locations 120, a microphone array orientation 254, one or more valid user voice print's 256, a voice assistant location 258, and one or more false trigger indication phrases 260.

The user location data 252 may record one or more user locations 120 that are identified by the presence sensors 130. In one embodiment, the user location data 252 records current user locations 120. In addition, the user location data 252 may record historical user locations 120.

The microphone array orientation 254 may specify the directional microphone response 125 of the microphone array 145. In one embodiment, the microphone array orientation 254 specifies a direction, such as a direction to the user location 120 specified by the user location data 252. In addition, the microphone array orientation 254 may specify a combination of microphone signals for generating the directional microphone response 125.

Each valid user voice print 256 may record a voice print for an authenticated user of the voice assistant 110. For example, the voice assistant 110 may record valid user voice prints 256 for each user in a household. The valid user voice prints 256 may be used to distinguish valid user triggers from false triggers generated by televisions, radios, and other audio sources as will be described hereafter.

The voice assistant location 258 may specify a current location of the voice assistant 110. In addition, the voice assistant location 258 may characterize the current location. For example, the current location may be characterized as outside, inside, office, crowd, street, noisy, and the like. The trigger location 209 may record the voice assistant location 258 for a trigger when the trigger is received.

The false trigger indication phrase 260 may store one or more phrases that may be spoken by a user to indicate that the voice assistant 110 has received a false trigger. For example, the phrase "that's not what I meant" may be spoken by a user to the voice assistant 110 to indicate that a trigger is a false trigger. Table 1 lists some false trigger indication phrases 260, but is not an exclusive list.

TABLE 1

That's not what I meant
No
That's not right
I didn't say that

Figure 4A:
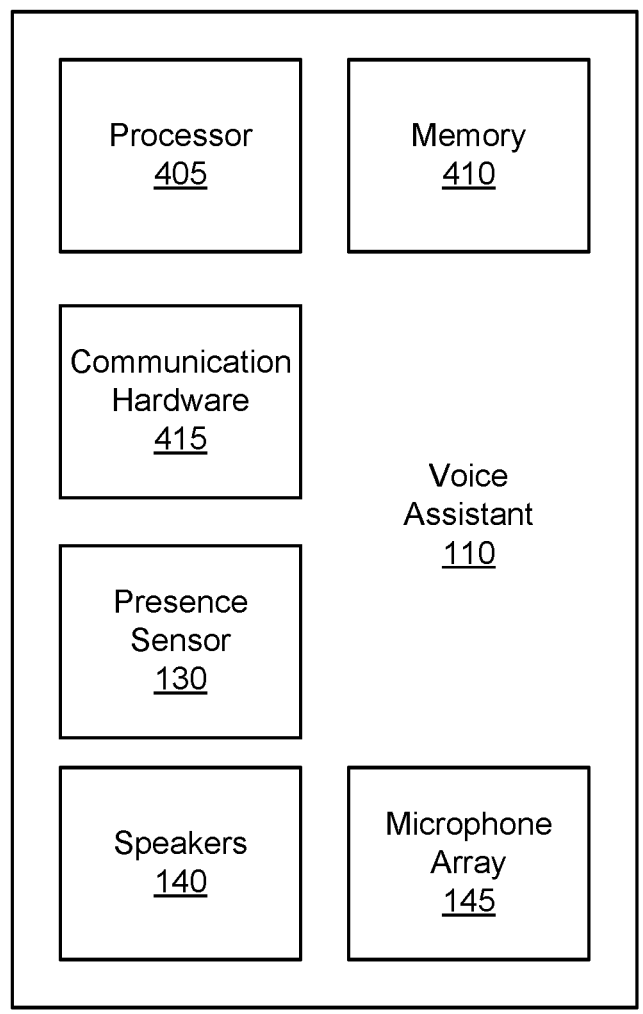
FIG. 4A is a schematic block diagram illustrating one embodiment of a voice assistant.
Figure 4B:
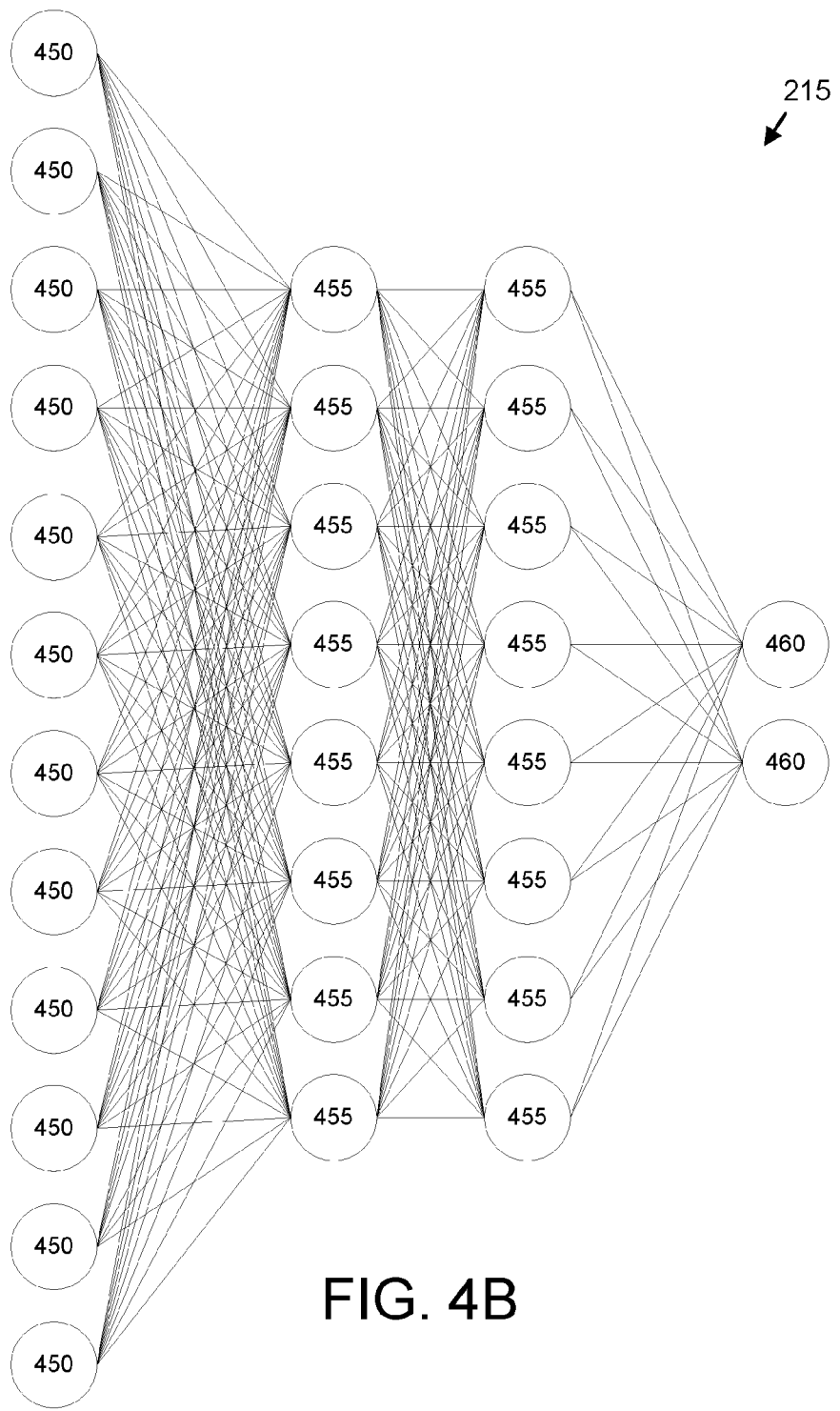
FIG. 4B is a schematic diagram illustrating one embodiment of a neural network learning structure.

FIG. 4A is a schematic block diagram illustrating one embodiment of the voice assistant 110. In the depicted embodiment, the voice assistant 110 includes a processor 405, a memory 410, communication hardware 415, the presence sensor 130, one or more speakers 140, and the microphone array 145. The processor 405, memory 410, and communication hardware 415 may also be embodied in the server 105.

The memory 410 may include a semiconductor storage device, hard disk drive, a micromechanical storage device, an optical storage device, or combinations thereof. The memory 410 may store code. The processor 405 may execute the code. The communication hardware 415 may communicate with other devices such as the network 115.

FIG. 4B is a schematic diagram illustrating one embodiment of a neural network learning structure 215. The neural network learning structure 215 may be organized as a data structure in a memory. In the depicted embodiment, the neural network learning structure 215 includes a plurality of input neurons 450, a plurality of hidden neurons 455, and a plurality of output neurons 460. The neural network learning structure 215 may be trained with trigger data 200 from one or more triggers and false triggers. The neural network learning structure 215 may then be used to determine whether a trigger is valid or false.

Figure 5A:
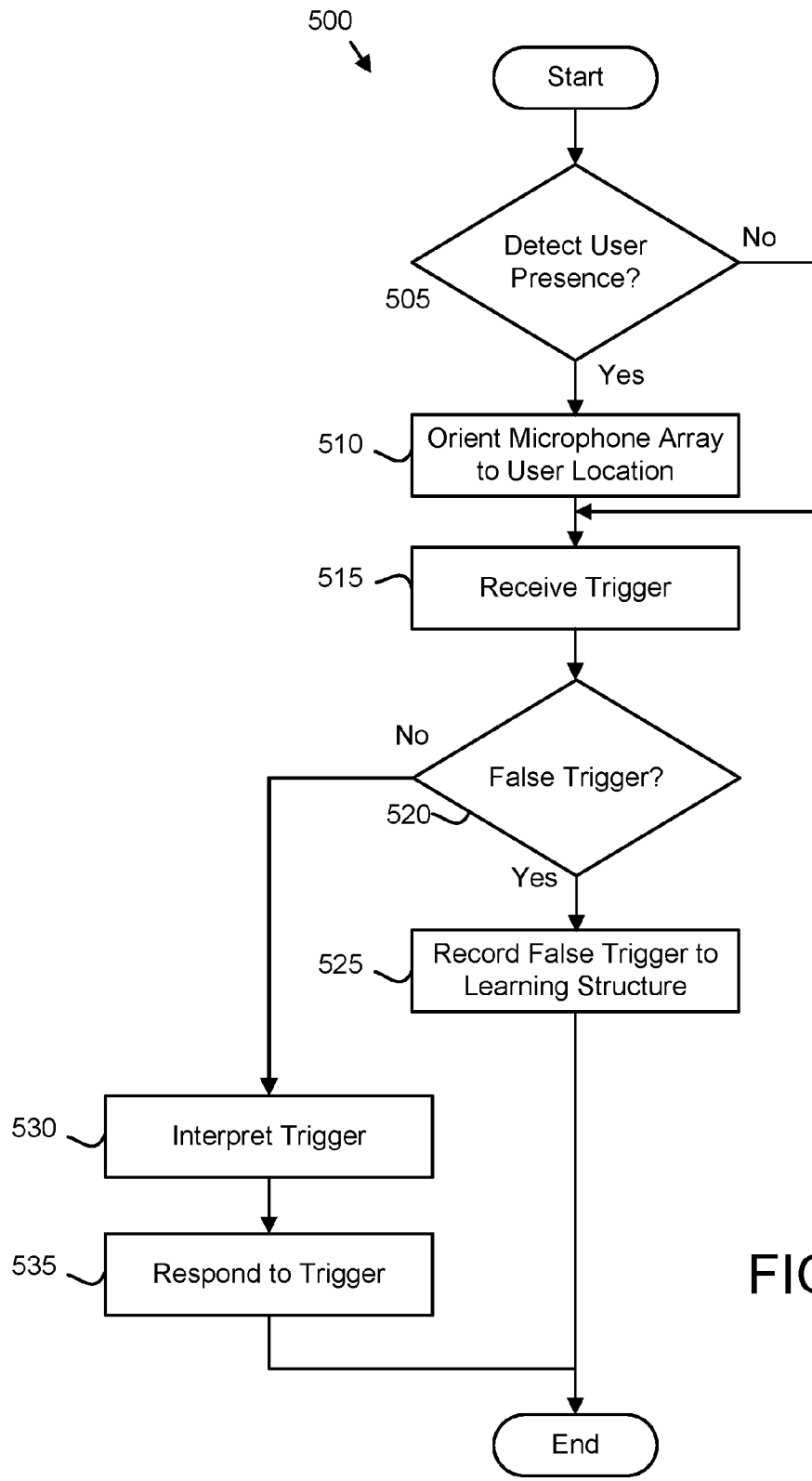
FIG. 5A is a schematic flow chart diagram illustrating one embodiment of a voice assistance method.

FIG. 5A is a schematic flow chart diagram illustrating one embodiment of a voice assistance method 500. The method 500 may be used to orient the microphone array 145 to user location 120. In addition, the method 500 may determine if a trigger is a false trigger and either record the false trigger to the learning structure 215 or interpret and respond to the trigger. The method 500 may be performed by the voice assistant 110 and/or the server 105. In addition, the method 500 may be performed by the processor 405 of the voice assistant 110 and/or the server 105.

The method 500 starts, and in one embodiment, the processor 405 detects 505 a user location 120 with the presence sensor 130. The presence sensor 130 may detect electromagnetic signals. In one embodiment, the presence sensor 130 uses the electromagnetic signals to detect the user at the user location 120. The processor 405 may calculate the user location 120 from the electromagnetic signals from the presence sensor 130. In addition, the processor 405 may calculate the user location 120 from electromagnetic signals that are processed and/or interpreted by the presence sensor 130. The user location 120 may be recorded in the user location data 252. If the processor 405 does not detect 505 the user location 120 with the presence sensor 130, the microphone array 145 may receive 515 a trigger.

The processor 405 may orient 510 the microphone array 145 to the user location 120. The processor 405 may generate the microphone array orientation 254 to orient 510 the microphone array 145 to the user location 120. The microphone array orientation 254 may specify the microphone array response 125 to include the user location 120, such as is illustrated in FIG. 1G.

The microphone array 145 may receive 515 a trigger. The trigger may be received 515 from the user at the user location 120 of the plurality of user locations 120 recorded by the user location data 252. The processor 405 may store the received trigger in the trigger data 200. In one embodiment, the processor 405 parses the trigger into one or more subcomponents 202. In addition, the processor 405 may assign subcomponent weights 204 to each subcomponent 202. In an additional embodiment, the processor 405 may present the trigger data 200 as inputs to the input neurons 450 of the neural network learning structure 215. The processor 405 may further employ the microphone array 145 to determine the user direction 206. For example, if the present sensors 130 have detected a plurality of user locations 120, the microphone array 145 may be used to determine the user direction 206 and corresponding user location 120 of the user that issued the trigger. In addition, the processor 405 may record the trigger timestamp 208 and the trigger location 209.

The processor 405 may determine 520 if the trigger is a false trigger. The determination 520 of whether the trigger is a false trigger is described in more detail in FIG. 5B. If the processor 405 determines 520 that the trigger is a false trigger, the processor 405 records 525 the false trigger to the learning structure 215 and the method 500 ends. The recorded 525 false triggers may subsequently be used to determine 520 future false triggers. In one embodiment, the processor 405 sets the trigger validity 210 to indicate a false trigger. The processor 405 may further store the subcomponents 202 and the subcomponent weights 204 associated with the false trigger to record 525 the false trigger to the learning structure 215.

In addition, the processor 405 may train the neural network learning structure 215 with the trigger data 200 of the false trigger. In one embodiment, the false trigger is recorded 525 using back propagation in the neural network learning structure 215.

If the processor 405 determines that the trigger is not a false trigger, the processor may interpret 530 the trigger. The interpretation 530 of the trigger may be a function of the trigger. In addition, the interpretation 530 of the trigger may be a function of the trigger, the voice assistant location 258, and/or a current time. For example, the trigger may be interpreted 530 based on both the trigger and the context in which the trigger is received.

The processor 405 may respond 535 to the trigger and the method 500 ends. The processor 405 may respond 535 with a response that is generated as a function of the interpretation 530 of the trigger. The processor 405 may respond 535 to the trigger with the speaker 140 oriented toward the user location 120. In one embodiment, the response is directed to the user location 120 from which the trigger was received. For example, the speakers 140 may be selected to direct the response to the user location 120 as illustrated in FIG. 1H. In one embodiment, the response is directed to the user direction 206. FIG. 5C describes embodiments of responding 535 to the trigger in more detail.

Figure 5B:
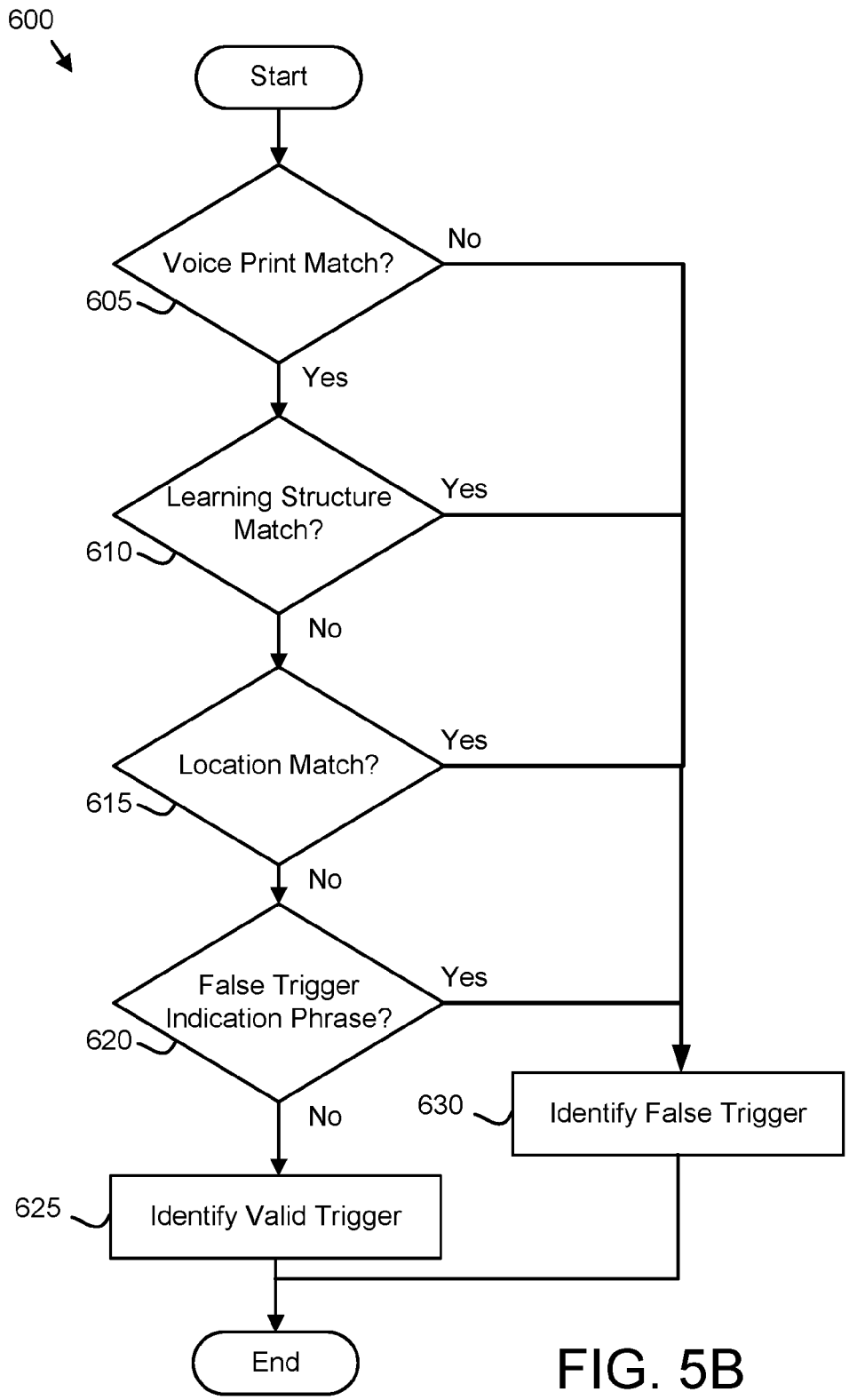
FIG. 5B is a schematic flow chart diagram illustrating one embodiment of a false trigger detection method.
Figure 5C:
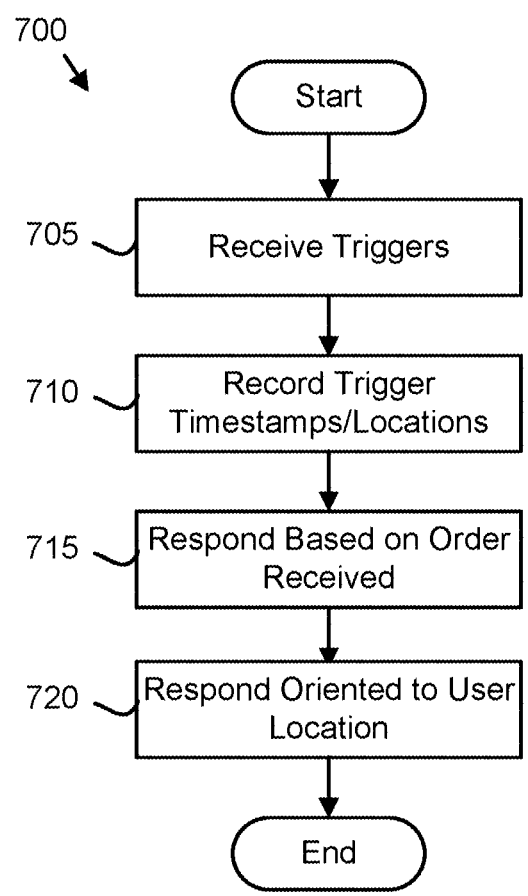
FIG. 5C is a schematic flow chart diagram illustrating one embodiment of a response method.

FIG. 5B is a schematic flow chart diagram illustrating one embodiment of a false trigger detection method 600. The method 600 may determine if the trigger is a false trigger and may perform the functions of step 520 of FIG. 5A. The method 600 may be performed by the voice assistant 110 and/or the server 105. In addition, the method 600 may be performed by the processor 405 of the voice assistant 110 and/or the server 105. The method 600 includes one or more tests that may be employed singly or in combination with other tests. Any test may be omitted or included in the method 600.

The method 600 starts, and in one embodiment, the processor 405 determines 605 if there is a match between the trigger and a valid user voice print 256. The processor 405 may compare one or more subcomponents 202 of the trigger data 200 for the trigger with each valid user voice print 256 to determine 605 if there is a voice print match. For example, a false trigger received from a television set would not match with a valid user voice print 256, allowing the processor 405 to detect the false trigger.

If there is no voice print match, the processor 405 may identify 630 a false trigger and the method 600 ends. If there is a voice print match, the processor 405 may determine 610 if there is a match between the trigger and the learning structure 215. In one embodiment, the processor 405 determines 630 the trigger is false using an independent component analysis on the subcomponents 202 and the subcomponent weights 204 of the learning structure 215. In addition, the processor 405 may determine 630 the trigger is false from a neural network calculation by the neural network learning structure 215.

If there is a learning structure match, the processor 405 may identify 630 a false trigger. If there is no learning structure match, the processor 405 may determine 615 if there is a location match. The processor 405 may determine 615 there is a location match based on subcomponents 202 of a previous false trigger from a trigger location 209 that is equivalent to the voice assistant location 258. For example, trigger data 200 may record a previous false trigger at a trigger location 209. If the voice assistant location 258 is equivalent to the trigger location 209, and the subcomponents 202 of the current trigger are equivalent to the subcomponents 202 of the previous false trigger, the processor 405 may identify a location match and identify 630 a false trigger.

If there is no location match, the processor 405 may determine 620 if the voice assistant 110 received a false trigger indication phrase 260. In one embodiment, the processor 405 compares the trigger and/or subcomponents 202 of the trigger to each false trigger indication phrase 260. If a false trigger indication phrase 260 is received, the processor 405 identifies 630 a false trigger. If no false trigger indication phrase 260 is received, the processor 405 may identify 625 a valid trigger and the method 600 ends.

FIG. 5C is a schematic flow chart diagram illustrating one embodiment of a response method 700. The response method 700 may respond to a trigger. The response method 700 may perform one embodiment of step 535 of FIG. 5A. The method 700 may be performed by the voice assistant 110 and/or the server 105. In addition, the method 700 may be performed by the processor 405 of the voice assistant 110 and/or the server 105.

The method 700 starts, and in one embodiment, the processor 405 receives 705 a plurality of triggers. Each trigger may be received 705 as described in step 515 of FIG. 5A. The processor 405 may record 710 the trigger timestamps 208 and the trigger locations 209 for each trigger. In addition, the processor 405 may record 710 the user direction 206 for each trigger.

The processor 405 may respond 715 to each trigger based on an order in which the trigger was received. The order may be determined from the trigger timestamp 208. For example, a trigger with an earliest trigger timestamp 208 may be responded to first.

The processor 405 may further respond 720 to each trigger with one or more speakers 140 oriented towards the user location from which the trigger was received and the method 700 ends. For example, a first speaker 140a may be used to respond 722 a trigger from a first user location 120a as illustrated in FIG. 1H. The one or more speakers 140 may be selected based on the user direction 206.

The embodiments detect the user location 120 with the presence sensor 130 and orient the microphone array 145 to the user location 120. As a result, the microphone array 145 has a directional microphone response 125 oriented to the user location even if the user has not spoken. In addition, the embodiments may respond to multiple triggers for multiple users based on an order that each trigger was received. As a result, the embodiments may respond coherently to multiple triggers.

The embodiments further respond to a trigger with the speaker 140 oriented towards the user location 120. As a result, each of one or more users may receive additional feedback that the response is directed specifically to the user.

The embodiments also determine if a trigger is a false trigger and record the false trigger to a learning structure 215. The trained learning structure 215 may subsequently be used to determine that other triggers are false triggers. Valid triggers may be interpreted and responded to.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a presence sensor that detects a user using electromagnetic signals;
    a processor;
    a memory that stores code executable by the processor to:
    detect a user location with the presence sensor;
    orient a microphone array to the user location;
    receive a trigger from the user at the user location, wherein the trigger is one or more of an audible command, request, and prompt;
    respond to the trigger;
    determine the trigger is a false trigger in response to the trigger comprising a false trigger indication phrase from the user;
    in response to determining the trigger is not a false trigger, interpret the trigger; and
    in response to determining the trigger is a false trigger, record the false trigger to a learning structure.

2. The apparatus of claim 1, wherein the presence sensor is one or more of a thermopile, a camera, and a network interface.

3. The apparatus of claim 1, wherein the code is further executable by the processor to:
    receive the trigger from the user at the user location of a plurality of user locations;
    record a trigger timestamp and the user location for the trigger; and
    respond to the trigger based on an order that the trigger was received.

4. The apparatus of claim 3, wherein the code is further executable by the processor to respond to the trigger with a speaker oriented toward the user location.

5. The apparatus of claim 1, wherein the learning structure comprises a plurality of subcomponents and a subcomponent weight for each subcomponent and the code is further executable by the processor to determine the trigger is false using an independent component analysis.

6. The apparatus of claim 1, wherein the learning structure comprises a neural network, the false trigger is recorded using back propagation, and the code is further executable by the processor to determine the trigger is false from a neural network calculation.

7. The apparatus of claim 1, wherein the learning structure comprises locations of other triggers and the code is further executable by the processor to determine the trigger is false based on subcomponents of a false trigger from a trigger location that is equivalent to a voice assistant location.

8. A method comprising:
    detecting, by use of a processor, a user location with a presence sensor that detects a user using electromagnetic signals;
    orienting a microphone array to the user location;
    receiving a trigger from the user at the user location, wherein the trigger is one or more of an audible command, request, and prompt;
    responding to the trigger;
    determining the trigger is a false trigger in response to the trigger comprising a false trigger indication phrase from the user;
    in response to determining the trigger is not a false trigger, interpreting the trigger; and
    in response to determining the trigger is a false trigger, recording the false trigger to a learning structure.

9. The method of claim 8, wherein the presence sensor is one or more of a thermopile, a camera, and a network interface.

10. The method of claim 8, wherein the method further comprises:
    receiving the trigger from the user at the user location of a plurality of user locations;
    recording a trigger timestamp and the user location for the trigger; and
    responding to the trigger based on an order that the trigger was received.

11. The method of claim 10, wherein the method further comprises responding to the trigger with a speaker oriented toward the user location.

12. A program product comprising a non-transitory computer readable storage medium that stores code executable by a processor, the executable code comprising code to:
    detect a user location with a presence sensor that detects a user using electromagnetic signals;
    orient a microphone array to the user location;
    receive a trigger from the user at the user location, wherein the trigger is one or more of an audible command, request, and prompt;
    respond to the trigger;
    determine the trigger is a false trigger in response to the trigger comprising a false trigger indication phrase from the user;
    in response to determining the trigger is not a false trigger, interpret the trigger; and
    in response to determining the trigger is a false trigger, record the false trigger to a learning structure.

13. The program product of claim 12, wherein the presence sensor is one or more of a thermopile, a camera, and a network interface.

14. The program product of claim 12, wherein the code further:
    receives the trigger from the user at the user location of a plurality of user locations;
    records a trigger timestamp and the user location for the trigger; and
    responds to the trigger based on an order that the trigger was received.

15. The program product of claim 14, wherein the code further responds to the trigger with a speaker oriented toward the user location.

16. The method of claim 8, wherein the learning structure comprises a plurality of subcomponents and a subcomponent weight for each subcomponent and the method further determines the trigger is false using an independent component analysis.

17. The method of claim 8, wherein the learning structure comprises a neural network, the false trigger is recorded using back propagation, and the method further determines the trigger is false from a neural network calculation.

18. The program product of claim 12, wherein the learning structure comprises a plurality of subcomponents and a subcomponent weight for each subcomponent and the code further determines the trigger is false using an independent component analysis.

19. The program product of claim 12, wherein the learning structure comprises a neural network, the false trigger is recorded using back propagation, and the code further determines the trigger is false from a neural network calculation.

* * * * *